United States Patent
McCarthy, Jr.

(10) Patent No.: US 7,031,009 B2
(45) Date of Patent: Apr. 18, 2006

(54) USE OF E-MAIL FOR CAPTURE OF DOCUMENT METADATA

(75) Inventor: Thomas L. McCarthy, Jr., Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 939 days.

(21) Appl. No.: 10/025,893

(22) Filed: Dec. 26, 2001

(65) Prior Publication Data

US 2003/0117664 A1 Jun. 26, 2003

(51) Int. Cl.
*G06F 15/00* (2006.01)
*H04N 1/00* (2006.01)

(52) U.S. Cl. ............... 358/1.15; 358/402; 358/403

(58) Field of Classification Search ......... 358/1.15, 358/1.16, 1.17, 523, 524, 403, 407, 442, 358/443, 444, 468, 402; 382/100
See application file for complete search history.

(56) References Cited

U.S. PATENT DOCUMENTS 6,704,118 B1 * 3/2004 Hull et al. ............ 358/1.15
2003/0063770 A1 * 4/2003 Svendsen et al. ........ 382/100

* cited by examiner

*Primary Examiner*—Kimberly Williams
*Assistant Examiner*—Charlotte M. Baker
(74) *Attorney, Agent, or Firm*—Oliff & Berridge, PLC

(57) ABSTRACT

This invention allows the use of standard e-mail systems by a document capture system to solicit document metadata from a user. The document capture system sends an e-mail to the user associated with the captured document. The e-mail body contains the names of the metadata properties supported by the repository system for the captured document. An attachment to the e-mail consists of a screen resolution image of the first page of the captured document to remind the user about the particular document for which metadata is being requested. The user edits a reply e-mail body to supply metadata values for each of the metadata property names. When the user sends the reply, the document capture system extracts the metadata values from the e-mail body and stores the supplied metadata values and the captured document into the repository.

20 Claims, 4 Drawing Sheets

USE OF E-MAIL FOR CAPTURE OF DOCUMENT METADATA

FIELD OF INVENTION

This invention relates to document capture devices (e.g., document scanners) that have an inadequate or inconvenient user interface for entering metadata values.

BACKGROUND OF THE INVENTION

Documents stored into a document repository are most useful when they have associated metadata. Document metadata consists of information such as document title, document author(s), keywords, version, etc. Document repositories typically support queries on document metadata.

When a document is captured by a scanning device, the means for entering document metadata may be limited. Some scanning devices, or multi-function devices, lack an adequate User Interface for entering document metadata. Some current solutions require that the metadata be specified in advance in a "scan template" or a machine readable "paper UI". Therefore, what is needed is a document capture device incorporated into a networked system using network tools such as e-mail and personal workstations for supplementing the document capture device user interface.

SUMMARY OF THE INVENTION

This invention allows the use of standard e-mail systems by a document capture system to solicit document metadata from a user. The document capture system sends an e-mail to the user associated with the captured document. The e-mail "reply to" field specifies the address of the document capture system. The e-mail body contains the names of the metadata properties supported by the repository system for the captured document. An attachment to the e-mail consists of a screen resolution image of the first page of the captured document to remind the user about the particular document for which metadata is being requested. The user interacts with their e-mail access system (e.g., Microsoft Outlook) to generate a reply to the e-mail that contains the original e-mail body. The user then edits the reply e-mail body to supply metadata values for each of the metadata property names. When the user sends the reply, the document capture system extracts the metadata values from the e-mail body and stores the supplied metadata values and the captured document into the repository.

Still other aspects of the present invention will become apparent to those skilled in this art from the following description, wherein there is shown and described an embodiment of this invention by way of illustration of one of the modes best suited to carry out the invention. The invention is capable of other different embodiments and its details are capable of modifications in various, obvious aspects all without departing from the invention. Accordingly, the drawings and descriptions will be regarded as illustrative in nature and not as restrictive.

BRIEF DESCRIPTION OF THE DRAWINGS

The objects, features and advantages of the invention will become apparent upon consideration of the following detailed disclosure of the invention, especially when it is taken in conjunction with the accompanying drawings wherein.

DETAILED DESCRIPTION OF THE INVENTION

Figure 1:
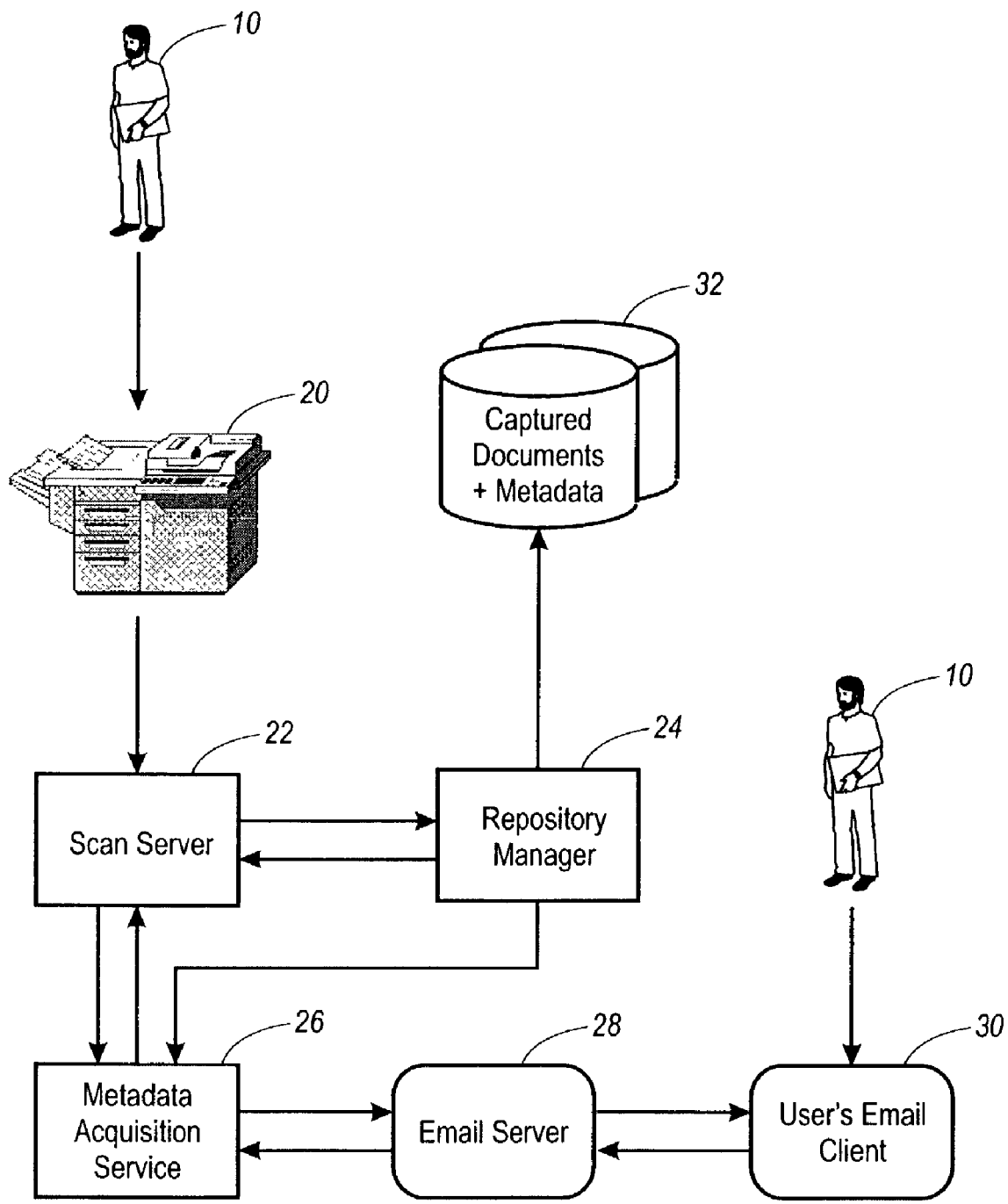
FIG. 1 is a high level system block diagram illustrating the document capture system in accordance with the present invention.
Figure 2:
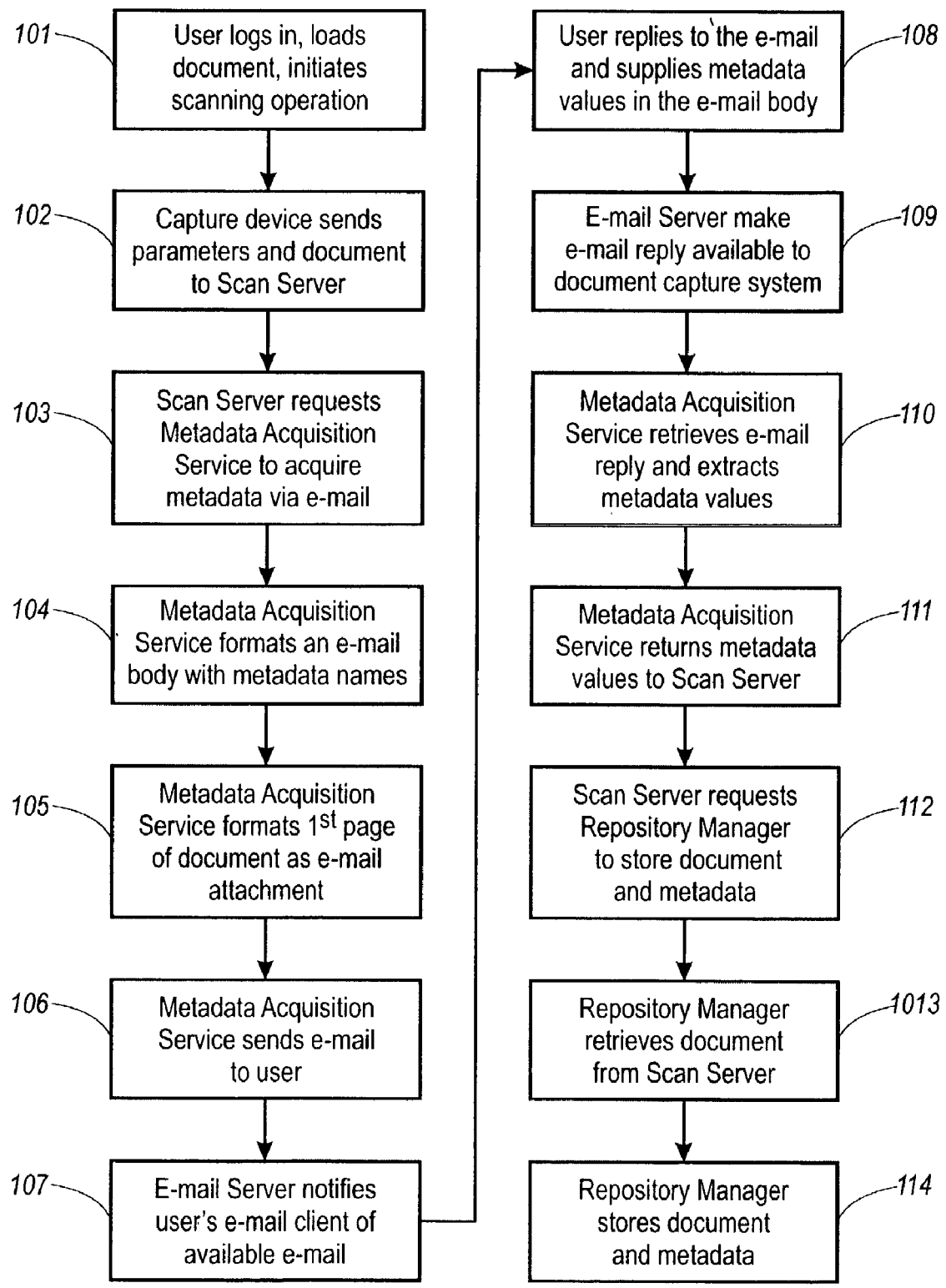
FIG. 2 is a high level flowchart showing process steps for the document capture system of FIG. 1.

FIGS. 1 and 2 depict a high level system block diagram and flowchart illustrating the document capture system in accordance with the present invention. Referring to FIGS. 1 and 2, the document capture system using e-mail for metadata acquisition is accomplished using the following steps. Initially, as shown in step 101, at a document capture device 20, a user 10 logs in and selects, enters or is associated with basic capture parameters such as a desired repository name, folder name, and metadata source. Once a paper document (not shown) is loaded into a document feeder of the document capture device 20, the user 10 presses a start button to initiate a scanning operation. When the scanning has completed, the user 10 removes the paper document and returns to their office. Next, the document capture device 20 delivers the basic capture parameters and the scanned document to a Scan Server 22, as shown in step 102. The Scan Server 22 provides temporary document storage while the metadata is acquired from the user 10.

The Scan Server 22 acquires the user's e-mail address and requests a Metadata Acquisition Service 26 to acquire the metadata for this document as shown in step 103. The request includes a URL to the first page of the scanned document, the user's email address, and the target repository's name. The Metadata Acquisition Service 26 requests and receives a capability description from a Repository Manager 24. The capability description includes the names of the supported repositories along with the metadata names supported by each repository. The Metadata Acquisition Service 26 formats an e-mail body with the metadata names supported by the specified repository 32, as shown in step 104.

Next, at step 105, the Metadata Acquisition Service 26 retrieves the first page of the scanned document from the Scan Server 22 and formats it as an email attachment. At step 106, the Metadata Acquisition Service 26 addresses the email to the user 10 and sets the "reply to" fields to the document capture system email account. The formatted email is then sent to an Email Server 28 for delivery to the user 10, as shown in step 106

Turning once again to FIGS. 1 and 2, in step 107 the Email Server 28 notifies the user's email client 30 of the available email and delivers the mail when the user 10 wishes to view it. The user 10 generates a reply in step 108 to the email that includes a copy of the original message. The user 10 edits the message in the reply body by entering metadata values beside the specified metadata names. When the user 10 sends the reply, the Email Server 28 makes it available to the document capture system, as shown in step 109.

Next, in step 110, the Metadata Acquisition Service 26 retrieves the email reply and extracts the metadata values.

The Metadata Acquisition Service 26 returns the metadata values to the Scan Server 22 in step 111, completing the request for metadata acquisition. The Scan Server 22 in step 112 makes a request of the Repository Manager 24 to store the document. Next in step 113, the Repository Manager 24 retrieves the captured document from the Scan Server 22. Lastly, the Repository Manager 24 stores the captured document and its associated metadata into the specified folder in the target repository 32, as shown in step 114.

Figure 5:
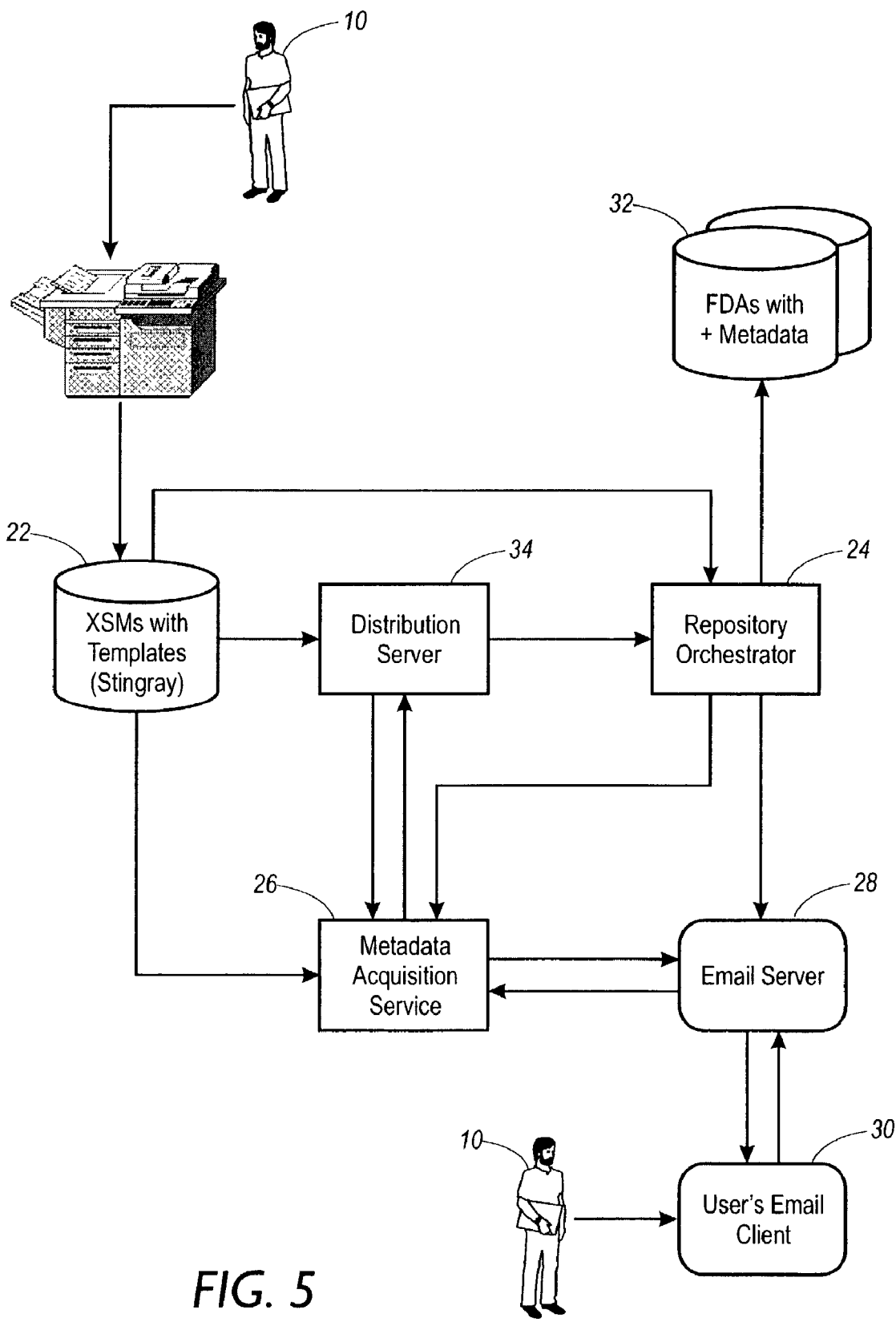
FIG. 5 is a high level system block diagram illustrating an implementation example using the document capture system of FIG. 1.

Referring now to FIG. 5, a high level system block diagram illustrating an implementation example using the document capture system and flowchart of FIGS. 1 and 2 is shown. A user 10 has a paper document that needs to be shared with a number of colleagues. The user 10 has access to an EOM-branded document distribution system using the present invention from the Xerox Corporation. To distribute the document, the user 10 logs into a local document capture device, which may be referred to as the Document Centre and selects a personal template that identifies the target repository, folder name, and document format. The user 10 then selects the option to enter document metadata via email, and provides a secure representation of the user's repository access credentials.

Figure 3:
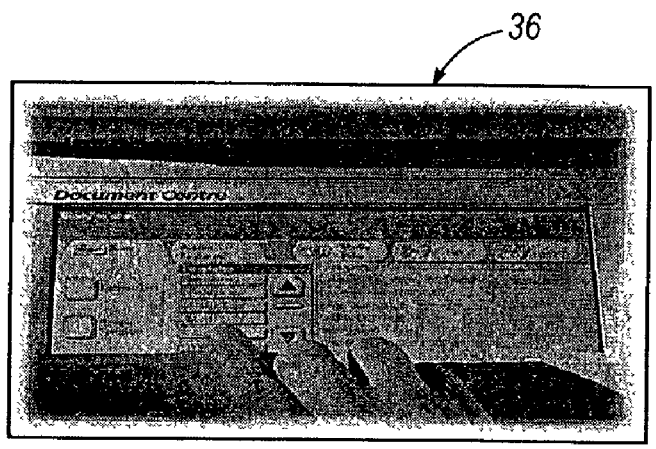
FIG. 3 is a graphical illustration showing a first user interface for selecting a template.
Figure 4:
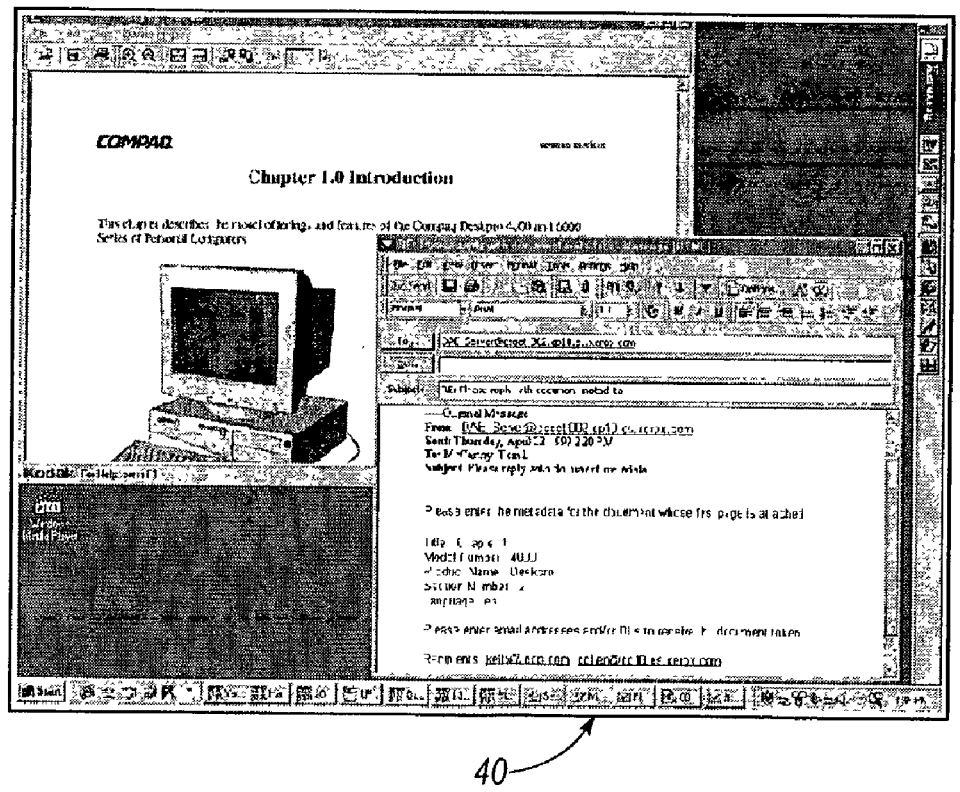
FIG. 4 is a graphical illustration showing a second user interface for response by a user.

The user 10 interacts with the system using two different user interfaces. The first user interface 36 is at the Document Centre when the user logs in and selects the desired "template". The template contains previously specified document distribution parameters such as repository and folder names, access credentials, and metadata source. FIG. 3 shows the user selecting a template. The second user interface 40 is the user's email client. The user 10 replies to an email from the distribution system and supplies metadata values and a distribution list. The distribution system attached the first page of the scanned document as a reminder of the document to which the metadata applies. FIG. 4 shows a typical user interface.

The user 10 places the document into the document feeder of the Document Centre, and presses, by way of example only, a green button. The user 10 returns to their office and notices an email from the document distribution system. The email body presents the document metadata names in a form that has space for the user 10 to enter metadata values. There is also a place for the user 10 to specify the document distribution list. The user 10 selects the "Reply" button of the email client and fills in the metadata values and distribution list in the included copy of the original message. When the user 10 selects the "Send" button, the email reply is delivered to the document distribution system, which extracts the metadata values and distribution list. Finally, the document is converted to the specified format, stored into the repository with the specified metadata, and a reference to the document is emailed to the specified distribution list.

More specifically, referring once again to FIG. 5, the document distribution scenario is accomplished using the following detailed steps. The user 10 logs in and selects a template containing the desired repository name, folder name, and metadata source. Once the paper document is loaded into the Document Centre document feeder, the user 10 presses the green button to initiate the scanning operation. When the scanning has completed, the user 10 removes the paper document and returns to their office. The Document Centre delivers the template and the scanned document in XSM format to a Scan Server 22. The Scan Server 22 notifies a Distribution Service 34 that a new document is ready for distribution. The Distribution Service 34 retrieves a reference to the document and reads the associated template file. From the template, the Distribution Service 34 extracts the repository name and the metadata source that, in this scenario, is the user's email address.

The Distribution Service 34 requests the Metadata Acquisition Service 26 to acquire the metadata for this document. The request includes a URL to the first page of the scanned document, the user's email address, and the target repository's name. The Metadata Acquisition Service 26 requests a capability description from a Repository Orchestrator 24. The capability description includes the names of the supported repositories along with the metadata names supported by each repository. The Metadata Acquisition Service 26 formats an email body with the metadata names supported by the specified repository 32.

The Metadata Acquisition Service 26 retrieves the first page of the scanned document from the Scan Server 22 and formats it as an email attachment. The Metadata Acquisition Service 26 addresses the email to the user 10 and sets the "reply to" field to the distribution system email account. The formatted email is sent to an enterprise Email Server 28 for delivery to the user 10. The Email Server 28 notifies the user's email client of the available email and delivers the mail when the user 10 wishes to view it. The user 10 generates a reply to the email which includes a copy of the original message. The user 10 edits the message in the reply body by entering metadata values for the specified names. Additionally, the user 10 supplies a distribution list to which a reference to the document will be sent. When the user sends the reply, the Email Server 28 makes it available to the distribution system.

The Metadata Acquisition Service 26 retrieves the email reply and extracts the metadata values and distribution list. The Metadata Acquisition Service 26 returns the metadata values and the distribution list to the Distribution Service 34, completing the request for metadata acquisition. The Distribution Service 34 makes a request of the Repository Orchestrator 24 to format and store the document and then email a document reference to a distribution list. The Repository Orchestrator 24 retrieves the scanned document and manages its conversion to the specified format. The converted document and its associated metadata are stored into the specified folder in the target repository 32. The repository 32 returns a document reference to the Repository Orchestrator 24. The Repository Orchestrator 24 manages the formatting of the document reference into a document token. The document token is attached to an email body and sent to the Email Server 28 for delivery to the distribution list.

While the invention has been described above with reference to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

What is claimed is:

1. A document capture system for use by a user, comprising:
   a document capture device for delivering a scanned document from the user;
   a scan server for receiving said scanned document from said document capture device;
   a metadata acquisition service receiving a request from said scan server to acquire metadata;

a repository manager for receiving a request from said metadata acquisition service for a capability description; and an e-mail server for sending an e-mail formatted by said metadata acquisition service to the user wherein the user edits said e-mail by entering metadata values and sends said e-mail to said metadata acquisition service for storage and later retrieval by said repository manager.

2. The document capture system according to claim 1, further comprising:

said scan server providing temporary document storage while said metadata is acquired from the user.

3. The document capture system according to claim 2, further comprising:

said metadata acquisition service acquiring said metadata including a URL to a first page of said scanned document, user's email address, and a target repository's name.

4. The document capture system according to claim 3, further comprising:

said capability description includes names of supported repositories along with metadata names supported by each repository wherein said metadata acquisition service formats an email body with said metadata names supported by a specified repository.

5. The document capture system according to claim 4, further comprising:

said metadata acquisition service retrieves said first page of said scanned document from said scan server and formats it as an email attachment.

6. The document capture system according to claim 5, further comprising:

said metadata acquisition service retrieves said email reply and extracts said metadata values.

7. The document capture system according to claim 6, further comprising:

said metadata acquisition service returns said metadata values to said scan server, completing said request for metadata acquisition.

8. The document capture system according to claim 7, further comprising:

said scan server makes a request of said repository manager to store said document.

9. The document capture system according to claim 8, further comprising:

said repository manager retrieves said captured document from said scan server.

10. The document capture system according to claim 9, further comprising:

said repository manager stores said captured document and its associated metadata into a specified folder in said specified repository.

11. A method for capture of document metadata by a user, comprising the steps of:

delivering a scanned document by a document capture device to a scan server;

requesting a metadata acquisition service to acquire metadata by said scan server;

requesting a repository manager for a capability description from said metadata acquisition service; and sending an e-mail from an e-mail server formatted by said metadata acquisition service to the user wherein the user edits said e-mail by entering metadata values and sends said e-mail to said metadata acquisition service for storage and later retrieval by said repository manager.

12. The method according to claim 11, further comprising the step of:

providing temporary document storage by said scan server.

13. The method according to claim 12, further comprising the step of:

acquiring said metadata including a URL to a first page of said scanned document, user's email address, and a target repository's name.

14. The method according to claim 13, further comprising the step of:

retrieving said first page of said scanned document from said scan server and formating it as an email attachment.

15. The method according to claim 14, further comprising the step of:

retrieving said email reply and extracting said metadata values by said metadata acquisition service.

16. The method according to claim 15, further comprising the step of:

returning said metadata values to said scan server, completing said request for metadata acquisition.

17. The method according to claim 16, further comprising the step of:

requesting said repository manager to store said document by said scan server.

18. The method according to claim 17, further comprising the step of:

retrieving said captured document from said scan server by said repository manager.

19. The method according to claim 18, further comprising the step of:

storing said captured document and its associated metadata into a specified folder in a specified repository by said repository manager.

20. A document capture system, comprising:

means for delivering a scanned document by a document capture device to a scan server;

means for requesting a metadata acquisition service to acquire metadata by said scan server;

means for requesting a repository manager for a capability description from said metadata acquisition service; and means for sending an e-mail from an e-mail server formatted by said metadata acquisition service to the user wherein the user edits said e-mail by entering metadata values and sends said e-mail to said metadata acquisition service for storage and later retrieval by said repository manager.

* * * * *